(12) United States Patent
Choi et al.

(10) Patent No.: US 8,015,187 B2
(45) Date of Patent: Sep. 6, 2011

(54) PHONE BOOK GROUP MANAGEMENT METHOD FOR MOBILE TERMINAL

(75) Inventors: Yeon Kyu Choi, Gumi-si (KR); Suk Woo Chae, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 351 days.

(21) Appl. No.: 11/775,495

(22) Filed: Jul. 10, 2007

(65) Prior Publication Data

US 2008/0109408 A1    May 8, 2008

(30) Foreign Application Priority Data

Nov. 6, 2006   (KR) .................. 10-2006-0108974

(51) Int. Cl.
*G06F 7/00* (2006.01)
*G06F 17/30* (2006.01)
(52) U.S. Cl. ...................................... 707/736; 707/758
(58) Field of Classification Search ................ None
See application file for complete search history.

(56) References Cited

U.S. PATENT DOCUMENTS

| | | | |
|---|---|---|---|
| 5,528,691 A * | 6/1996 | Rosauer et al. ............... 380/273 |
| 6,404,884 B1 * | 6/2002 | Marwell et al. .......... 379/265.13 |
| 6,606,105 B1 * | 8/2003 | Quartetti ....................... 715/853 |
| 6,948,130 B2 * | 9/2005 | Long et al. .................... 715/752 |
| 7,337,448 B1 * | 2/2008 | Dalia et al. .................... 719/328 |
| 2003/0214530 A1 * | 11/2003 | Wang et al. .................... 345/757 |
| 2004/0122822 A1 * | 6/2004 | Thompson et al. ........... 707/100 |
| 2005/0125466 A1 * | 6/2005 | Tsujimoto ..................... 707/204 |
| 2006/0111135 A1 * | 5/2006 | Gray et al. ..................... 455/519 |
| 2006/0224968 A1 * | 10/2006 | Urquhart et al. .............. 715/741 |
| 2006/0248465 A1 * | 11/2006 | Ryu et al. ....................... 715/739 |
| 2007/0081197 A1 * | 4/2007 | Omoigui ....................... 358/403 |

FOREIGN PATENT DOCUMENTS

| | | |
|---|---|---|
| KR | 10-2003-0069332 | 8/2003 |
| KR | 10-0620004 | 8/2006 |
| KR | 10-2006-0113340 | 11/2006 |
| KR | 10-0652732 | 11/2006 |

* cited by examiner

*Primary Examiner* — Jay A Morrison
(74) *Attorney, Agent, or Firm* — H.C. Park & Associates, PLC

(57) ABSTRACT

A phone book group management method includes: providing a display field for entering a contact name and a group name of a phone book; receiving a contact name and at least one group name consecutively in the display field; analyzing the received contact name and at least one group name; and registering contact information in a group according to the analyzed contact name and at least one group name. A new group may be created while registering a contact name in a phone book or while editing phone book data of a registered contact. Accordingly, the procedure for registering a contact may be simplified, and management of user groups may be executed more easily and efficiently.

7 Claims, 18 Drawing Sheets

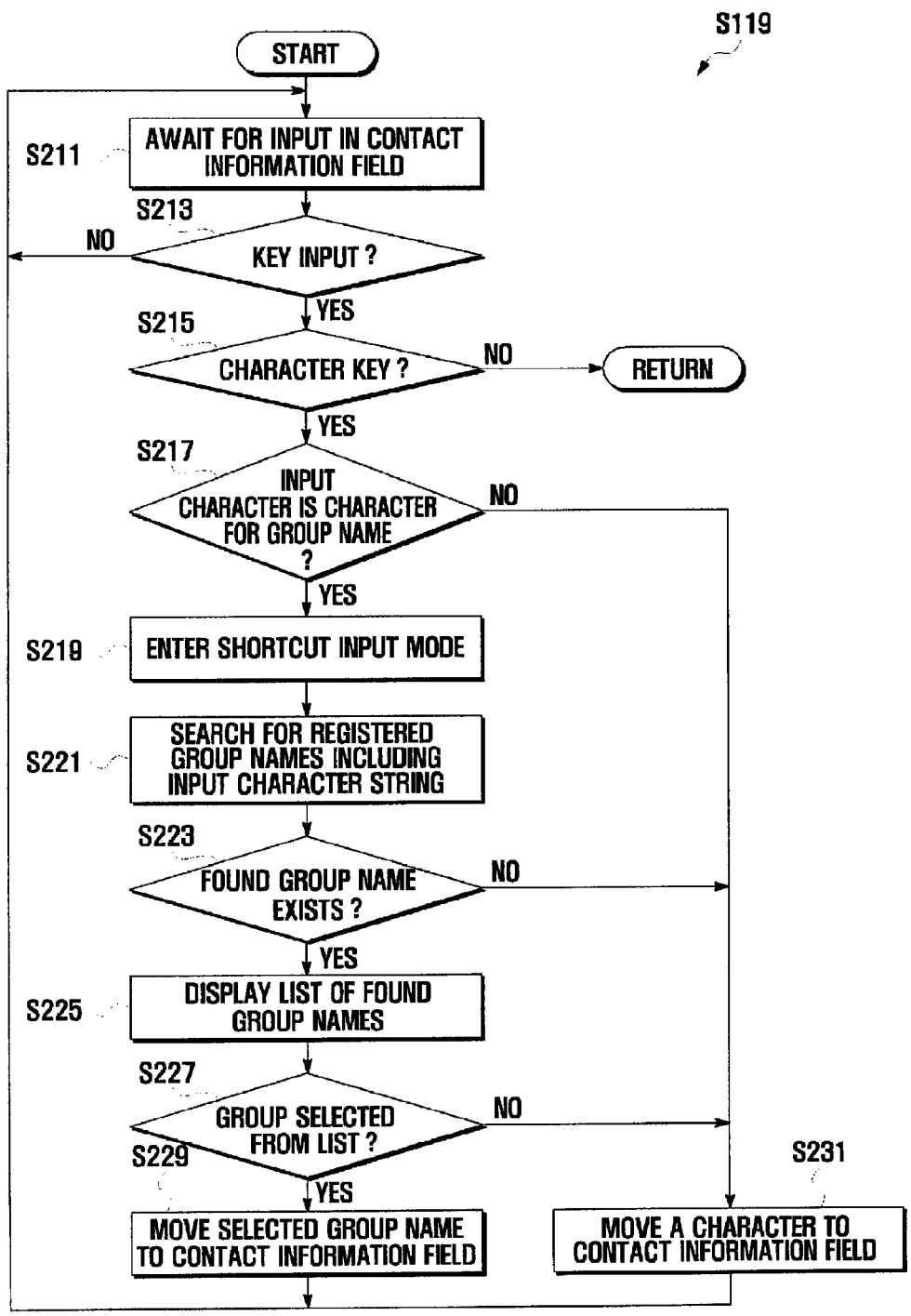

PHONE BOOK GROUP MANAGEMENT METHOD FOR MOBILE TERMINAL

CROSS REFERENCE TO RELATED APPLICATION

This application claims priority from and benefit of Korean Patent Application No. 2006-0108974, filed on Nov. 6, 2006, which is hereby incorporated by reference for all purposes as if fully set forth herein.

BACKGROUND OF THE INVENTION

1. Field of the Invention

The present invention relates to a mobile terminal, and more particularly, to a phone book group management method for a mobile terminal, enabling efficient management of phone book data.

2. Discussion of the Background

A mobile terminal is a small portable terminal operated by a user. In the mobile terminal, a phone book provides contact information, such as a telephone number, e-mail addresses, and memos. A user may manage the contact information in groups.

With recent development in performance and diversified functions of the mobile terminal, the capacity of the phone book has increased remarkably. In order to manage an increased quantity of telephone numbers stored in the mobile terminal efficiently, the telephone numbers may be managed by groups. The user may manage information of a plurality of contacts by using a phone book group management function of the mobile terminal.

However, in conventional technology of phone book management, phone book groups are predetermined, and the contact information (for example, telephone number) is stored in one of the predetermined corresponding groups. A new phone book group may be created in a group addition mode. Accordingly, the user may experience inconvenience in registering new contact information in a new group, because the user first creates the new group in the group addition mode and then registers the new contact information in the newly created group. In order to create a plurality of groups, the user may repeat the procedure of creating a group.

For the above reasons, users may assign phone book data of many contacts to a single group (for example, "unassigned" group) without classification, and thereby the phone book group management function may not be fully utilized.

SUMMARY OF THE INVENTION

The present invention provides a phone book group management method for creating a new group without relying on a fixed group addition mode.

The present invention also provides a phone book group management method for simplifying a registration procedure of phone book data that may be easy to use.

Additional features of the invention will be set forth in the description which follows, and in part will be apparent from the description, or may be learned by practice of the invention.

The present invention discloses a phone book group management method for a mobile terminal including: providing a display field for entering a contact name and a group name of a phone book; receiving the contact name; receiving the group name; analyzing the contact name and the group name; and registering contact information in a group according to the contact name and the group name.

The present invention also discloses a phone book group management method for a mobile terminal including: displaying a field containing a contact name and a group name in response to a request to modify a contact group of a phone book; receiving a modification of the group name displayed in the field; analyzing the modified group name; and updating the contact group according to the contact name and analyzed group name.

The present invention also discloses a phone book group management method for a mobile terminal including: providing a display field for entering a keyword in response to a request for a search for phone book data; receiving a keyword in the display field; analyzing the keyword; searching for registered group names and contact names using the keyword; and displaying a list of registered group names and contact names a character of the keyword.

The present invention also discloses a phone book group management method for a mobile terminal including: detecting generation of an event accompanying deletion of a group member of a phone book group; determining whether any group members remain in the group after execution of the event; and deleting the group if no group members remain in the group.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 5 is a flow chart showing detailed steps of inputting data in the process of registering contact information of FIG. 2.

DETAILED DESCRIPTION OF THE ILLUSTRATED EMBODIMENTS

Hereinafter, exemplary embodiments of the present invention are described in detail with reference to the accompanying drawings. The same reference numbers are used throughout the drawings to refer to the same or like parts. Detailed descriptions of constructions or processes known in the art may be omitted to avoid obscuring the subject matter of the present invention.

The following terms are used throughout the specification of the present invention.

A contact name means a name assigned by a user. The user may assign a real name or a nickname as the contact name, and one contact name may be assigned to a plurality of telephone numbers.

A first identification symbol is used for group management and distinguishes a contact name from a group name. A second identification symbol is used to distinguish consecutive group names. The first and second identification symbols include various characters provided by a keypad, such as "*", "#", "/", "@", "-", and a space. Each identification symbol may be used with one or more characters in combination. Although "-" is used as the first identification symbol and "," is used as the second identification symbol throughout the following exemplary embodiments, the present invention is not limited thereto.

Figure 1:
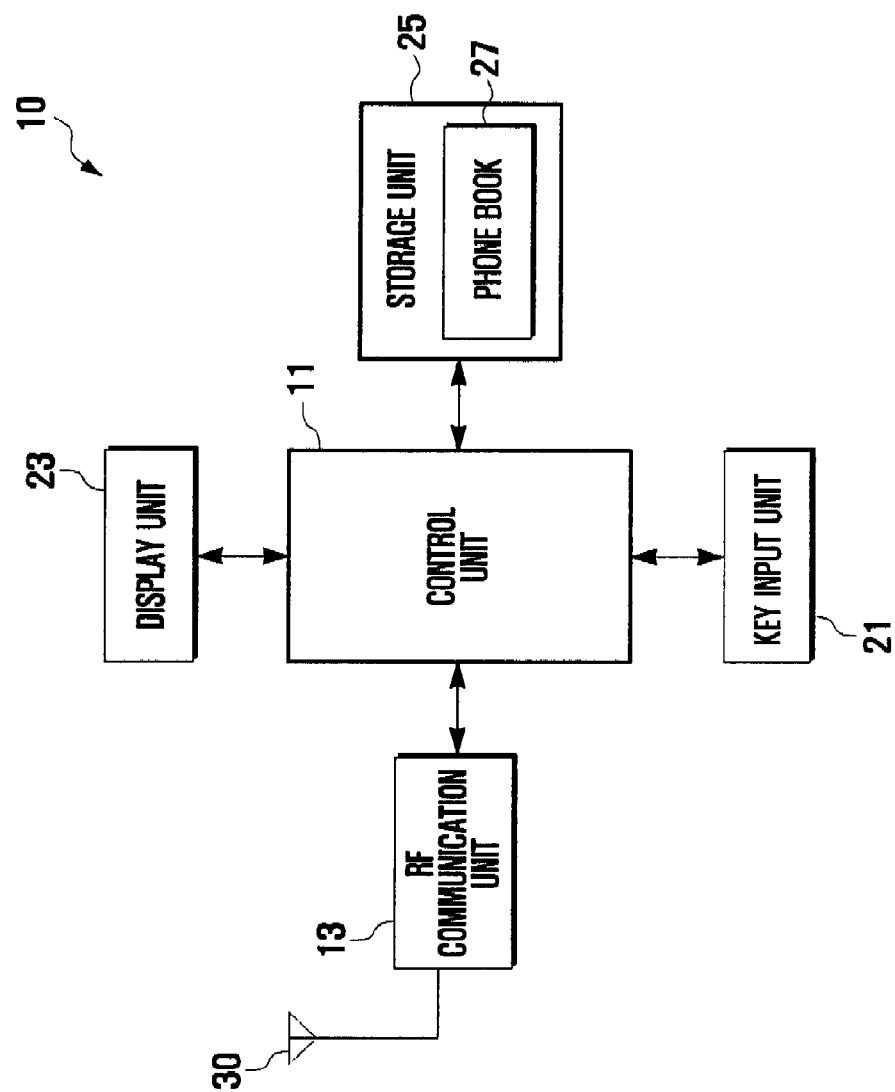
FIG. 1 is a block diagram showing a configuration of a mobile terminal used for a phone book group management method according to exemplary embodiments of the present invention.

FIG. 1 is a block diagram showing a configuration of a mobile terminal used for a phone book group management method according to exemplary embodiments of the present invention.

Referring to FIG. 1, the mobile terminal 10 includes a control unit 11, RF (radio frequency) communication unit 13, key input unit 21, display unit 23, and storage unit 25. The RF communication unit 13 performs a voice communication function and a messaging function. The control unit 11 performs a phone book management function by controlling a phone book 27 and operating programs stored in the storage unit 25.

The RF communication unit 13 converts an RF signal received from an antenna 30 to a digital signal, and converts a digital signal sent by the control unit 11 to an RF signal and transmits the RF signal. The storage unit 25 stores programs for general operation of the mobile terminal 10 and data generated during the operation of the mobile terminal 10. The storage unit 25 provides the phone book 27 for user convenience. A user may manage contact information such as telephone numbers by using the phone book 27. The display unit 23 displays information related to the operation of the mobile terminal 10. In particular, the display unit 23 provides visual information on the management of the phone book 27 according to the control unit 11. The key input unit 21 includes alphanumeric and function keys for user input and generates command signals for the operation of the mobile terminal 10. The control unit 11 controls general operations of the mobile terminal 10 as well as functions of registering, editing, deleting, and searching phone book data.

Figure 2:
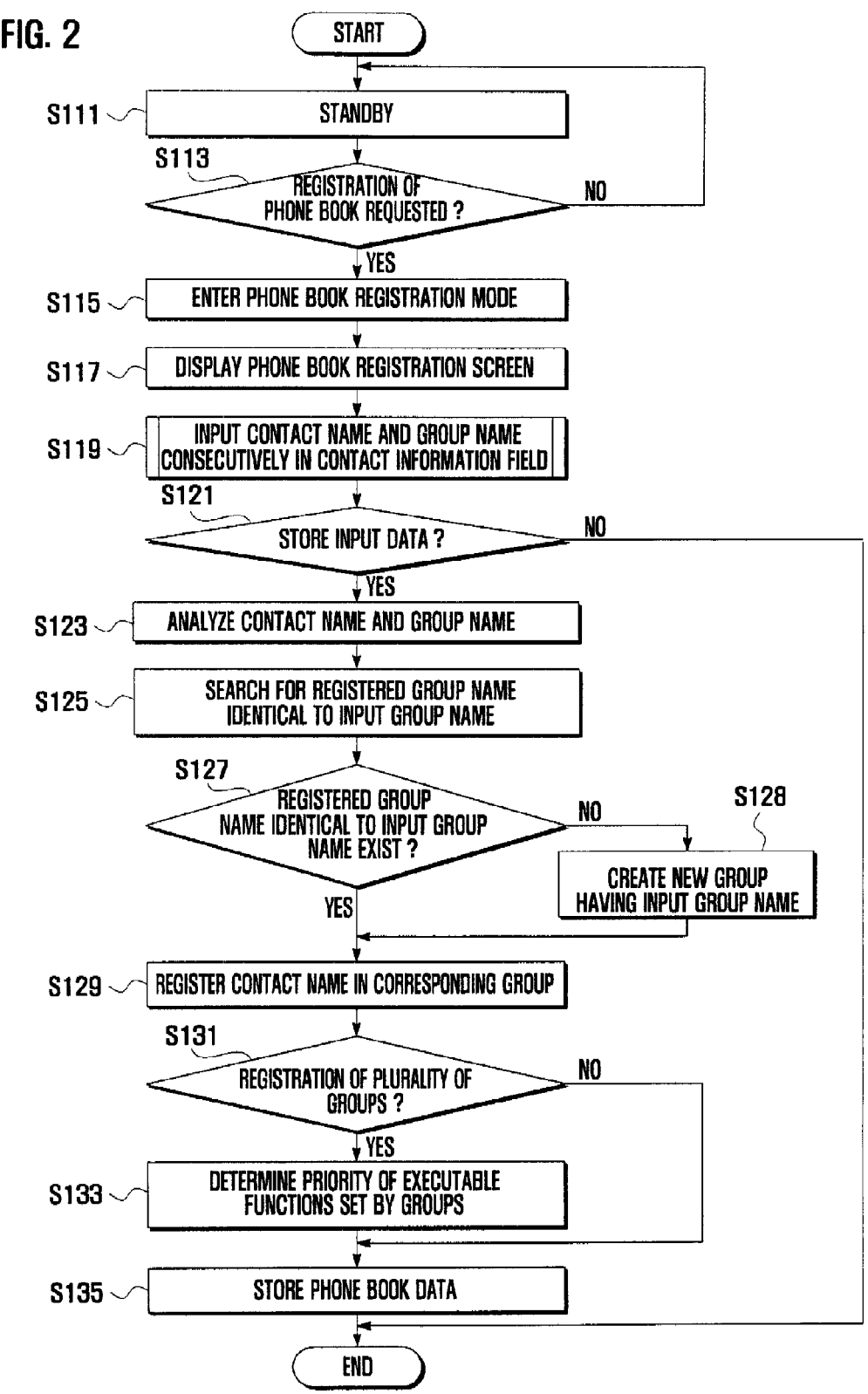
FIG. 2 is a flow chart showing a process of registering contact information by groups in a phone book group management method according to an exemplary embodiment of the present invention.
Figure 3:
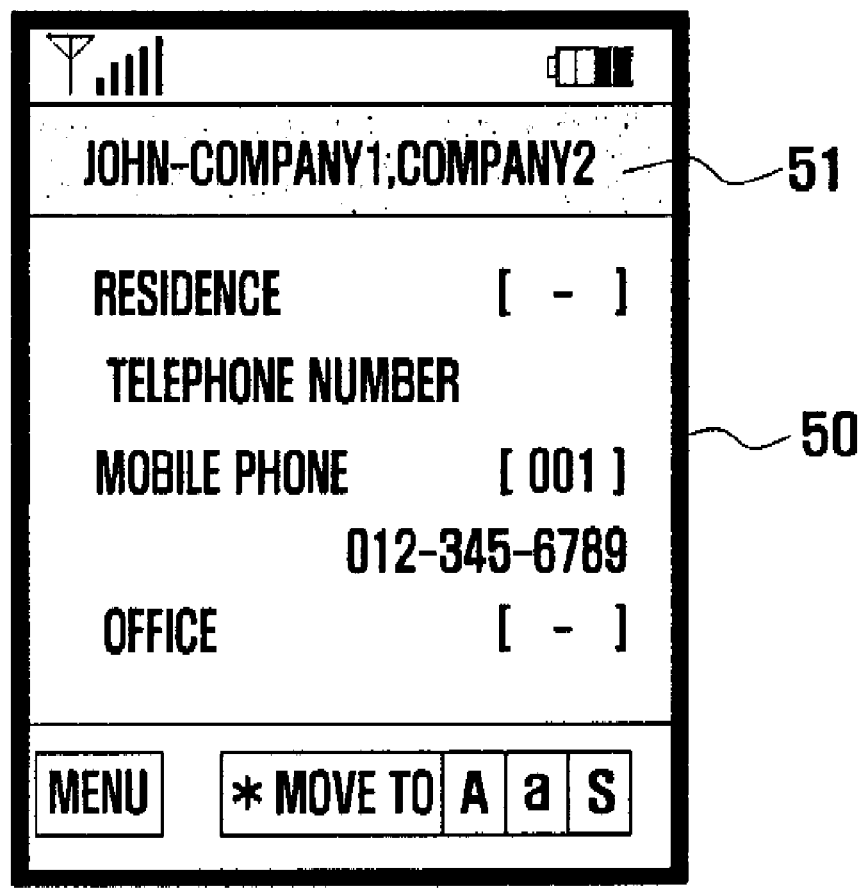
FIG. 3 shows an example of a contact information field on a display screen in the process of registering contact information of FIG. 2.
Figure 4:
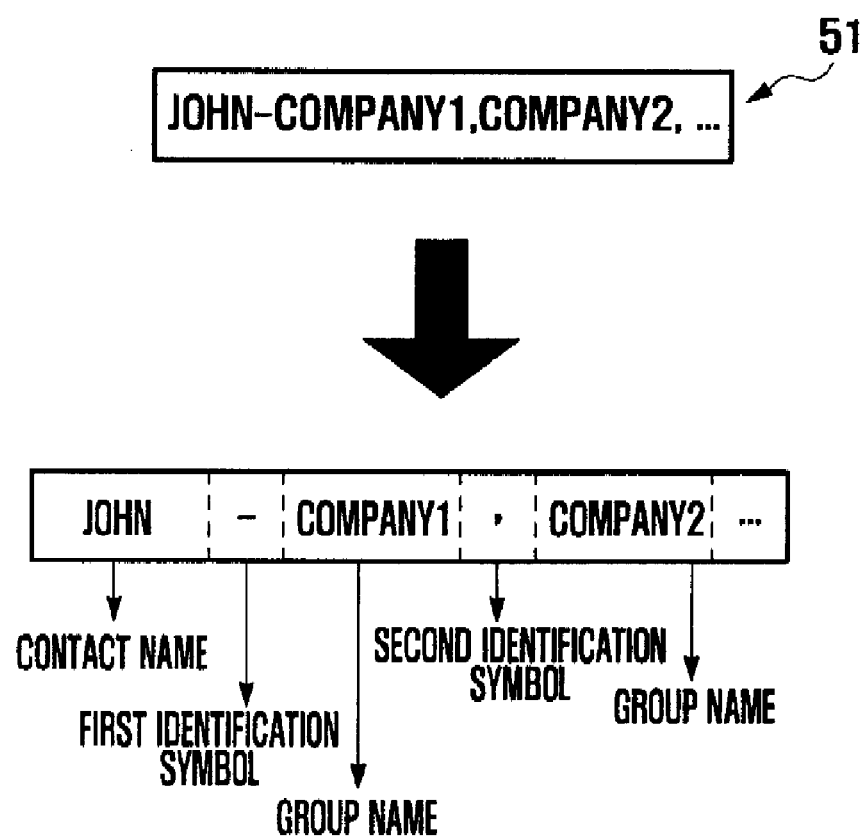
FIG. 4 shows a structure of the contact information field of FIG. 3.

FIG. 2 is a flow chart showing a process of registering contact information by groups in a phone book group management method according to an exemplary embodiment of the present invention. FIG. 3 shows an example of a contact information field on a display screen in the process of registering contact information of FIG. 2, and FIG. 4 shows a structure of the contact information field of FIG. 3.

Referring to FIG. 2, the user of the mobile terminal 10 performs a key input to enter a registration mode for registering a contact in the phone book 27. In a standby state (S111), the control unit 11 identifies a request for registering phone book data (S113), and the mobile terminal 10 enters the registration mode according to the user's selection (S115).

After entering the registration mode, the control unit 11 controls the display unit 23 to display a registration screen (S117). As shown in FIG. 3, the registration screen 50 has a plurality of fields for entering data. A contact information field 51 is a field for entering a contact name and group names and has sufficient space for entering multiple group names. An example the contact information field 51 in the registration screen is illustrated in FIG. 3. However, the contact information field may be displayed in a pop-up window or in other screen forms.

In addition to the contact information field 51, the registration screen 50 may include input fields for a home telephone number, a mobile telephone number, an office telephone number, a fax number, other telephone numbers, an e-mail address, and memos. Contact information may be entered in each field according to the user's selection. In the example, a phone book group is managed with a contact name. Descriptions of entering information in any field other than the contact information field 51 are omitted here.

After the registration screen 50 is displayed, the user may start entering data in the contact information field 51. According to the user's key selection, the control unit 11 consecutively enters a contact name and group names in the contact information field 51 (S119). The control unit 11 controls the display unit 23 to display input characters for user identification. The input characters may be stored temporarily in the control unit 11 or in the storage unit 25 prior to approval of storage.

At step S119, the user enters a first identification symbol after the contact name and enters a group name after the first identification symbol. When entering a plurality of group names, the group names are separated by inserting a second identification symbol between consecutive group names. FIG. 4 illustrates an example of the contact information field 51 with data entered by the user.

As shown in FIG. 4, "John-Company1,Company2" is entered in the contact information field 51. In this example, the contact name is "John", the first identification symbol is "-", the second identification symbol is ",", and the group names are "Company1" and "Company2". That is, the group names are consecutively entered after the contact name by inserting the first identification symbol between the contact name and the first group name, and by inserting the second identification symbol between consecutive group names.

The control unit 11 identifies whether the first identification symbol (for example, "-") is entered. If the first identification symbol is entered, the control unit 11 identifies a character string preceding the first identification symbol as a contact name and identifies a character string following the first identification symbol as a group name. Additionally, the control unit 11 identifies whether the second identification symbol (for example ",") is entered after the first identification symbol and distinguishes group names of a plurality of group names using the second identification symbol. If group names are consecutively entered after the contact name, the control unit 11 performs a shortcut input mode of a registered group name.

Completing the input of a contact name and group names, the user may request storage of the contact information by entering a confirmation key. The control unit 11 identifies whether the confirmation key to store phone book data is entered (S121). If the confirmation key is not entered, the registration mode terminates.

If a confirmation key is entered, the control unit 11 analyzes the contact name and group names in the contact information field 51 (S123). The control unit 11 identifies a character string preceding the first identification symbol "-" as a contact name and identifies a character string following the first identification symbol "-" as a group name. Additionally, the control unit 11 identifies the second identification symbol "," after the first group name and identifies a character string following the second identification symbol "," as another group name. The control unit 11 analyzes the contact name and group names entered in the contact information field 51 by using the first and second identification symbols. At this step, the existence of a group name and the number of group names are identified. Alternatively, this step may be included in the shortcut input mode described above, and a contact name and group names entered in the shortcut input mode may be analyzed according to the user's request.

The control unit 11 searches for the input group name from among registered group names (S125) and determines whether the input group name is already registered (S127). If the input group name is already registered, the control unit 11 registers the input contact name as a group member of the registered group (S129). When storing phone book data, the control unit 11 may store the contact name and the group name separately. If the input group name is not yet registered, the control unit 11 creates a new group having the input group name (S128) and registers the input contact name in the new group as a group member at step S129.

If a plurality of group names are identified at step S123, the control unit 11 registers the contact name as a group member of each identified group. When registering the contact name, the contact name is mapped to the corresponding group. In addition to the contact name, contact information such as a shortcut number and a telephone number may also be mapped to the group name.

The control unit 11 then determines whether a plurality of groups has been identified from analysis at step S123 (S131). If a plurality of groups has been identified, the control unit 11 controls the display unit 23 to display a pop-up window including a list of groups such that the user may enter a priority of executable functions by groups, and sets the priority according to the user's input (S133). A function set to the group having the highest priority is executed. For example, ringing sound function that is set to the group having the highest priority produces a ringing sound when a call is received.

Finally, the phone book data is stored in the storage unit 25 (S135) and the registration mode terminates.

The control unit 11 may register a contact name in a single group by setting the priority of group names entered in the contact information field 51. The user may choose not to enter a group name in the contact information field 51, and in this case, the control unit 11 may register a contact name in a registered group name field or in a default group (for example, "unspecified group").

The phone book group management method according to the present invention may include a shortcut input process for entering a character string of a group name for user convenience. The shortcut input process includes the steps of searching registered group names, displaying a list of registered group names, and selecting a group name.

Figure 6A:
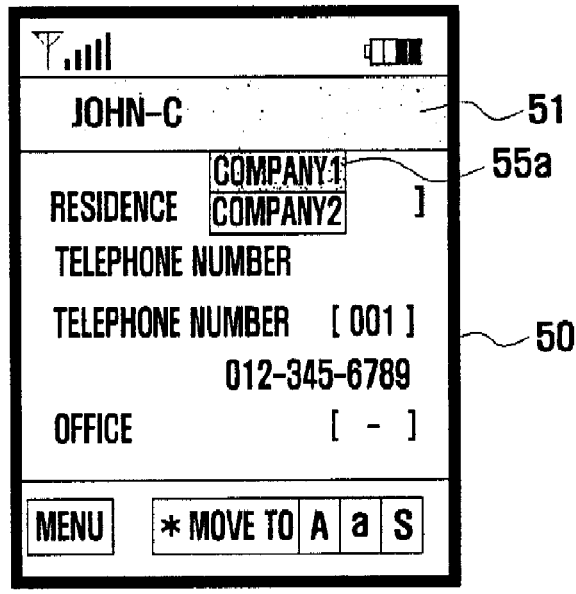
FIG. 6A, FIG. 6B, FIG. 8A, and FIG. 8B show examples of a display screen in the steps of inputting data of FIG. 5.
Figure 6B:
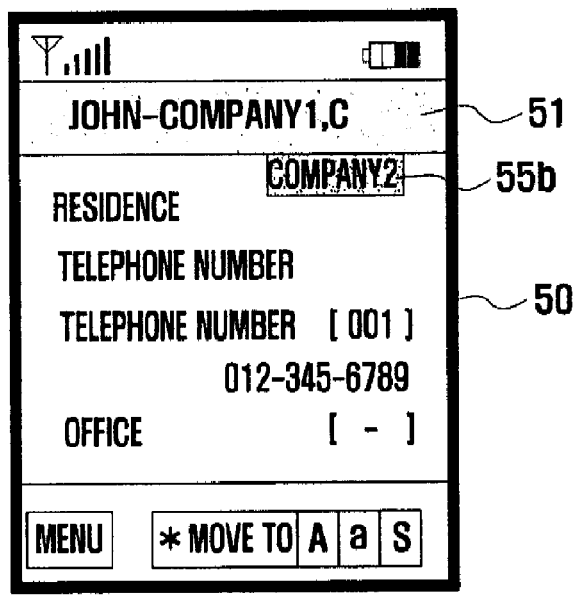

FIG. 5 is a flow chart showing detailed steps of inputting data at step S119 in the process of registering contact information of FIG. 2. FIG. 6A and FIG. 6B show examples of a display screen in the steps of inputting data of FIG. 5.

Referring to FIG. 5, the mobile terminal 10 in a standby state awaits data input in the contact information field 51 (211), and the control unit 11 determines whether a key is entered (S213). If a key is entered, the control unit 11 identifies whether the key is a character key (S215). If the key is a character key, the control unit 11 identifies whether the character key is a character for a group name (S217). The control unit 11 identifies the input character as a character for a group name when the input character is entered immediately following the first or second identification symbol.

If the input character is not a character for a group name, the control unit 11 moves the input character to the contact information field 51 (S231). The contact name, first identification symbol, group names, and second identification symbol are consecutively moved to the contact information field 51.

If the input character is a character for a group name, the control unit 11 controls the mobile terminal 10 to enter a shortcut input mode (S219).

After the mobile terminal enters a shortcut input mode, the control unit 11 searches registered group names (S221) and detects registered group names containing a character string identical to the input character string (S223). The character string includes all characters of a group name entered before the current cursor position. Accordingly, the user may obtain a correct search result corresponding to the input character string, even before the full group name is entered.

When a plurality of group names are entered after the first identification symbol, the control unit 11 sets each character string required for searching individual group names. The control unit 11 may search for a group name containing a character string identical to the input character string at its starting position or may search for a group name containing a character string identical to the input character string at any position.

If a registered group name containing a character string identical to the input character string is detected, the control unit 11 controls the display unit 23 to display a list of registered group names containing a character string identical to the input character string at its starting position (S225). The list of registered group names may be displayed in various forms such as a pop-up window and a drop box. Further, a list of registered group names containing a character string identical to the input character string at any position may be displayed according to a setting method. FIG. 6A is an example of a display screen showing a pop-up window 55a for displaying a list of registered group names found by entering the first identification symbol and a character string "C" in the contact information field 51. FIG. 6B is an example of a display screen showing a pop-up window 55b for displaying a list of registered group names found by additionally entering the second identification symbol and a character string of a second group name in the contact information field 51. In the case that a group name has been already entered in the contact information field 51 after the first identification symbol, the control unit 11 may exclude the group name from the second list of registered group names as shown in FIG. 6B.

After displaying the list of registered group names, the control unit 11 identifies whether a group name is selected by the user (S227). The user may select a group name from the list by using direction keys and a confirmation key.

If a group name is selected from the list, the control unit 11 moves the group name to the contact information field 51 (S229). If no group name is selected from the list, the control unit 11 moves the input character string to the contact information field 51 (S231). If no group name matching to the input character string is detected at step S223, the control unit 11 moves the input character string to the contact information field 51 at step S231.

When character input in the contact information field 51 is complete, the procedure returns to step S211, and a following character key is identified. The control unit 11 may complete input of contact name and group names by repeating the above steps. If no character key is identified at step S215, the procedure returns to step S121 of FIG. 2.

Figure 7:
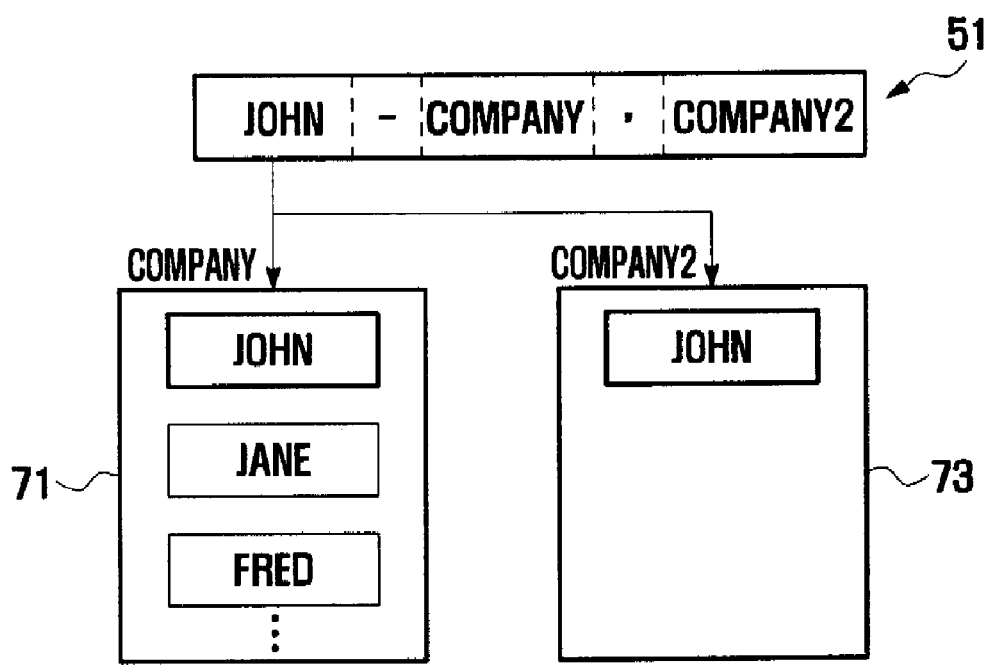
FIG. 7 shows a structure of a contact information field in the steps of inputting data of FIG. 5.
Figure 8A:
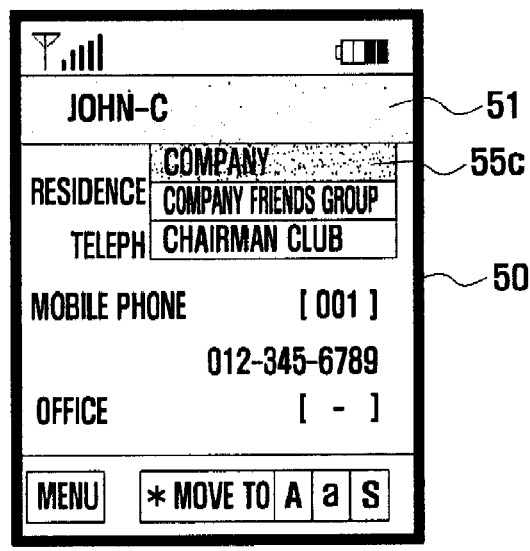
Figure 8B:
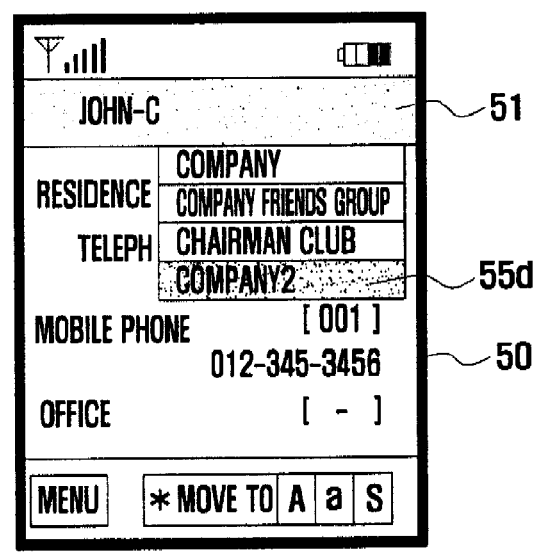

FIG. 7 shows a structure of a contact information field having a plurality of group names in the steps of inputting data of FIG. 5. FIG. 8A and FIG. 8B show examples of a display screen in the shortcut input mode in the steps of inputting data of FIG. 5.

Referring to FIG. 7, when two group names are entered in the contact information field 51, the control unit 11 identifies character input of the second group name by detecting the second identification symbol ",". The control unit 11 searches and displays registered group names corresponding to a character string entered after the first identification symbol "-" or after the second identification symbol ",". The user may select a group name from the list and enter the selected group name in the contact information field 51. If the user enters a confirmation key after entering the group name, the control unit 11 registers the corresponding contact name in group 71 and in group 73.

For example, if "John-Company,Company2" is entered in the contact information field 51, the control unit 11 registers the contact name "John" as a group member of the group 71, "Company", and as a group member of the group 73, "Company2". If the group 73, "Company2", is not yet registered, the control unit 11 creates and registers a new group named "Company2".

In the step of entering a plurality of group names, if "John-C" is entered in the contact information field 51 as shown in FIG. 8A, the control unit 11 searches registered group names and displays a list of registered group names containing the character "C" at its first character position such as "Company", "Company friends group", and "Chairman club", to a small pop-up window 55c. The pop-up window 55c is disposed near the input characters such that the user may easily identify and select a corresponding group. Therefore, in order to utilize a shortcut input function, the user may enter a keyword (for example, "John-C") for searching registered group names, select a group name from a list of the registered group names, then press a confirmation key.

When the user wants to register a contact name in a group other than the registered group names, the user may simply enter a complete group name after the contact name. For example, in order to register contact name "John" in group "Company2", the user may enter "John-Company2" and press a confirmation key. The control unit 11 then creates a group 73 of phone book data having a group name "Company2" and registers contact name "John" in the group. Accordingly, phone book data including group registration information is stored in the phone book 27.

When adding "Peter" as a further contact, if "Peter-C" is entered in the contact information field 51, the control unit 11 displays a list of registered group names containing the character "C" at its first character position such as, "Company", "Company friends group", "Chairman club", and "Company2", in a pop-up window 55d as shown in FIG. 8B. In order to register the contact name "Peter" in the group "Company2", the user may select "Company2" from the list of pop-up window 55d and enter a confirmation key.

As described above, in the phone book group management method according to this exemplary embodiment of the present invention, a contact name and group names are entered consecutively for registration of a contact, and input of contact name, and assignment of groups are performed simultaneously. Additionally, if a contact name and a new group name are entered consecutively, it creates a new group, and registers the contact name in the new group. Therefore, the creation of a new group and registration of a group member are performed easily by entering a contact name and corresponding group names in one input field.

Figure 9A:
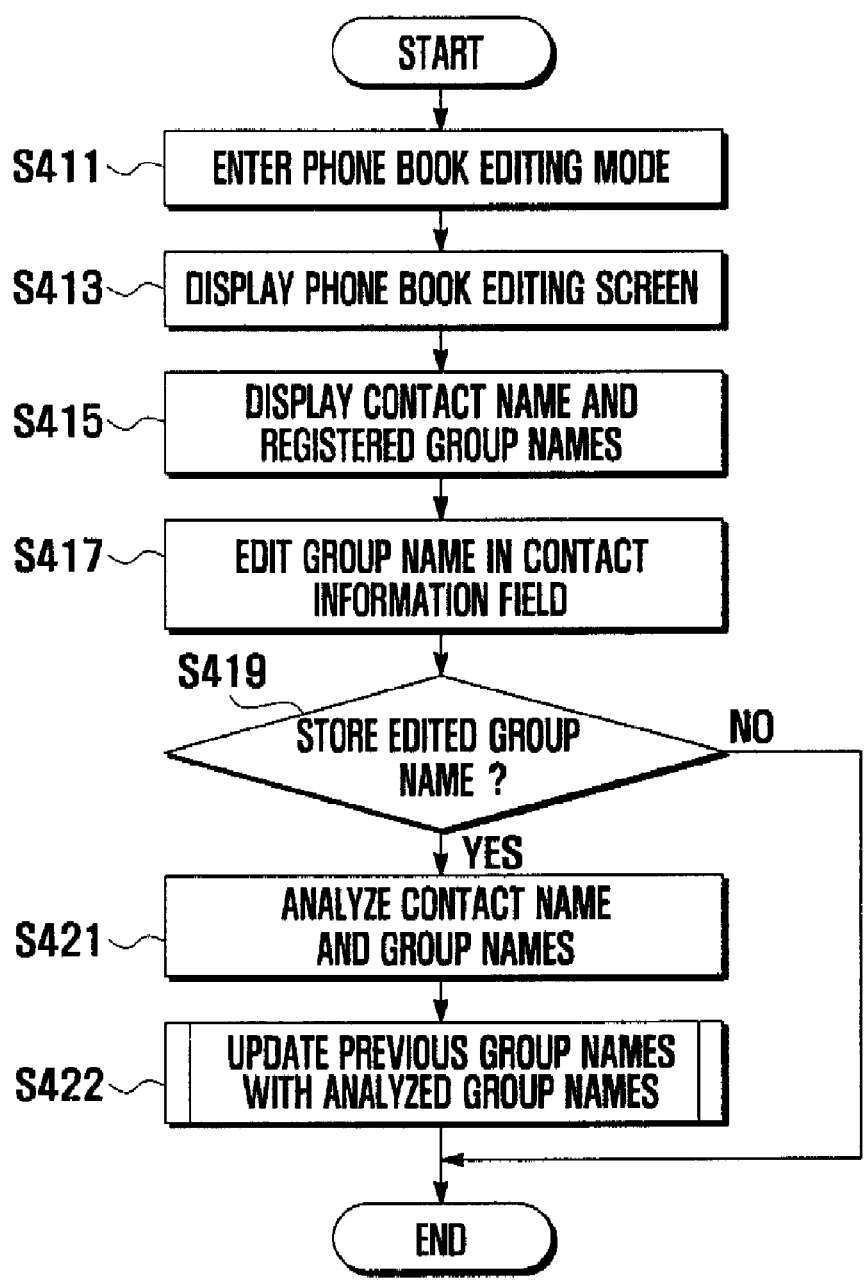
FIG. 9A and FIG. 9B are flow charts showing a process of modifying a group in an editing mode of a phone book group management method according to another exemplary embodiment of the present invention.
Figure 9B:
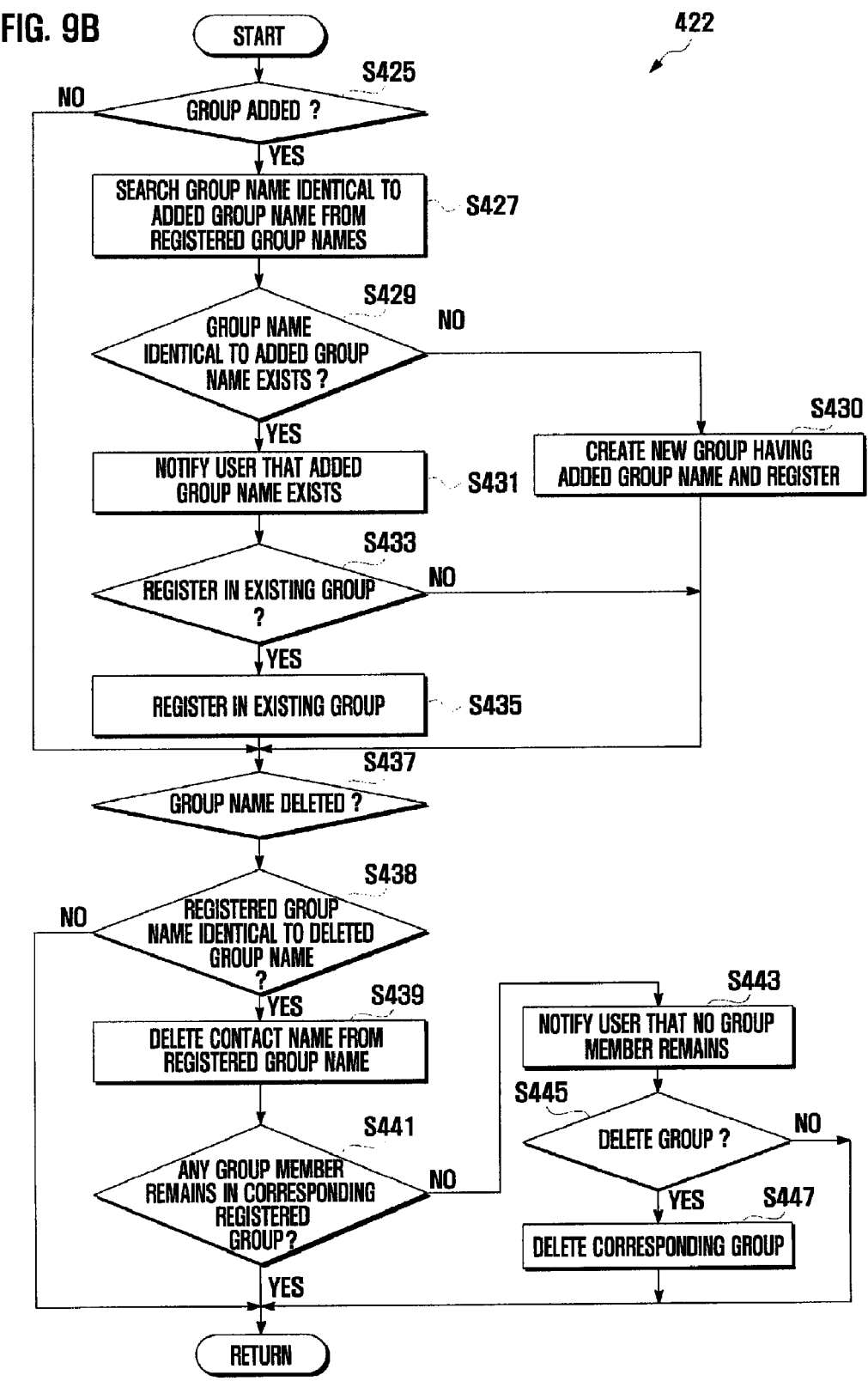
Figure 10A:
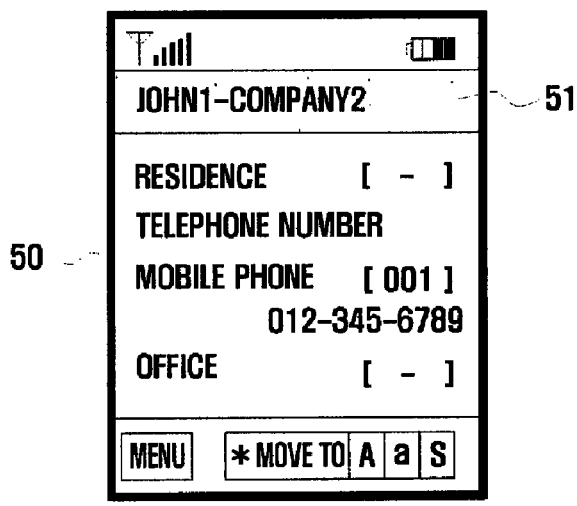
FIG. 10A and FIG. 10B show examples of a display screen in the process of modifying a group of FIG. 9A and FIG. 9B.
Figure 10B:
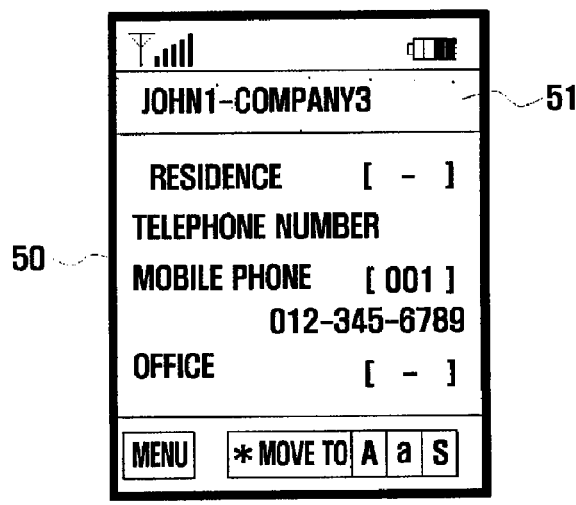
Figure 11:
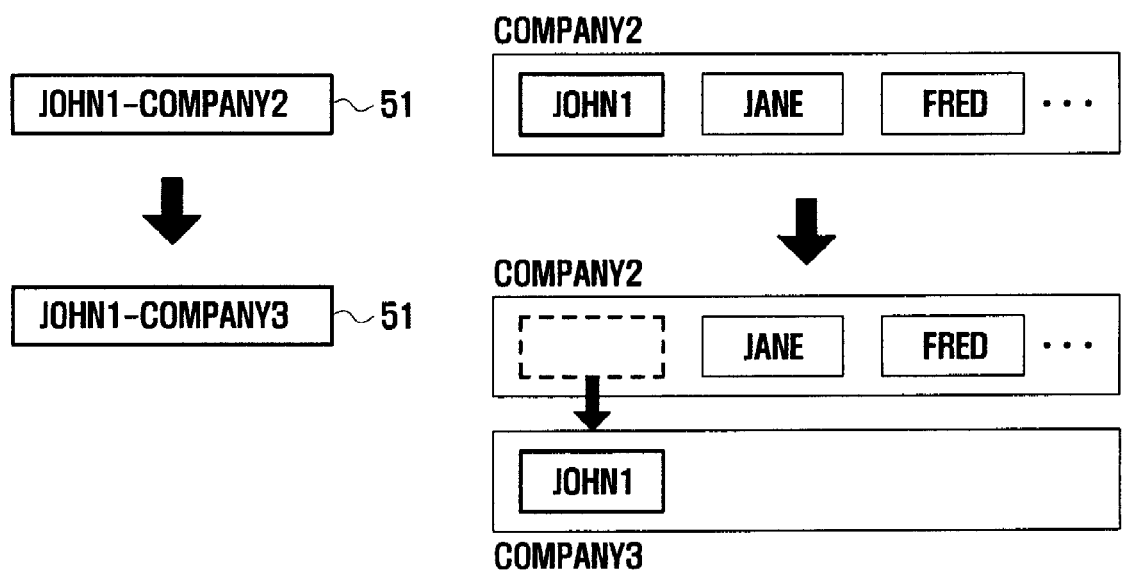
FIG. 11 shows a structure of a contact information field in the process of modifying a group of FIG. 9A and FIG. 9B.

FIG. 9A and FIG. 9B are flow charts showing a process of modifying a group in an editing mode of a phone book group management method according to another exemplary embodiment of the present invention. FIG. 10A and FIG. 10B show examples of a display screen in the process of modifying a group of FIG. 9A and FIG. 9B. FIG. 11 shows a structure of a contact information field in the process of modifying a group of FIG. 9A and FIG. 9B.

Referring to FIG. 9A, the user requests a phone book editing mode after selecting phone book data to be edited. The control unit 11 controls the mobile terminal 10 to enter the phone book editing mode according to the user's request (S411), and controls the display unit 23 to display an editing screen for phone book data including a contact information field 51 (S413).

The control unit 11 displays all group names assigned to a contact name to the contact information field 51 of the editing screen (S415), and thereby the user may identify all the group names currently assigned to the contact. In this step, the control unit 11 displays the contact name and group names by separating them with the first and second identification symbols as described above.

Subsequently, the control unit 11 edits the group names displayed in the contact information field 51 according to the user's key input (S417). In this step, the user may delete a group name displayed in the contact information field 51 or may add a desired group name by creating a new group. When entering a group name in the contact information field 51, the control unit 11 may perform a shortcut input function in the same manner as that described in relation to FIG. 8A and FIG. 8B.

The control unit 11 identifies input of a confirmation key to store the edited group name (S419). If no confirmation key is entered, the control unit 11 terminates the procedure. If a confirmation key is entered, the control unit 11 analyzes the contact name and edited group name in the contact information field 51 (S421). After completing the analysis, the control unit 11 may delete a group previously assigned to the contact name or may add a group having the analyzed group name according to the user's input (S422).

The steps S422 of changing to an analyzed group name is described in more detail referring to FIG. 9B.

Referring to FIG. 9B, the control unit 11 determines whether a group name has been added (S425). If a group name has been added, the control unit 11 searches registered group names (S427) and determines whether a registered group name identical to the added group name exists (S429).

If an identical group name does not exist among the registered group names, the control unit 11 creates a new group having the added group name and registers the contact name as a group member in the new group (S430), then the process goes to step S437. If there is a registered group name identical to the added group name, the control unit 11 informs the user that the same group name exists (S431) and asks the user for confirmation for changing the group (S433), then the process goes to step S437. If confirmed, the control unit 11 then registers the contact name in the registered group (S435).

After registering the added group name, the control unit 11 determines whether a group name has been deleted (S437).

If a group name has been deleted, the control unit 11 searches the registered group names, determines whether a registered group name identical to the deleted group name exists (S438), and deletes the contact name from the registered group name (S439). After deleting the contact name, the control unit 11 determines whether any group member remains in the registered group (S441). If no group member remains in the registered group, the control unit 11 informs the user that no group member remains in the group (S443), requests user confirmation for deleting the group (S445), and if confirmed, deletes the group (S447). If a group member remains in the registered group, the control unit 11 does not delete the group and terminates the procedure.

For example, if the user wants to change group name "Company2" of contact name "John1" as shown in FIG. 10A to group name "Company3", the user may change the content of the contact information field 51 to "John1-Company3" as shown in FIG. 10B. The control unit 11 searches for a group name "Company3" among the registered group names. If a group name identical to "Company3" is already registered, the control unit 11 registers contact name "John1" in the registered group "Company3" and deletes the contact name "John1" from the group "Company2" as shown in FIG. 11. If no group "Company3" exists, the control unit 11 creates a new group having the group name "Company3" and registers the contact name "John1" in the new group. Accordingly, the contact name "John1" becomes a new group member of the new group "Company3".

As described above, in the phone book management method according to this exemplary embodiment of the present invention, a contact group may be added, changed, or deleted by consecutively entering a contact name and a group name in a phone book editing mode. If no group is to be changed, a new group may be created, and the contact may be registered as a group member of the new group.

Figure 12:
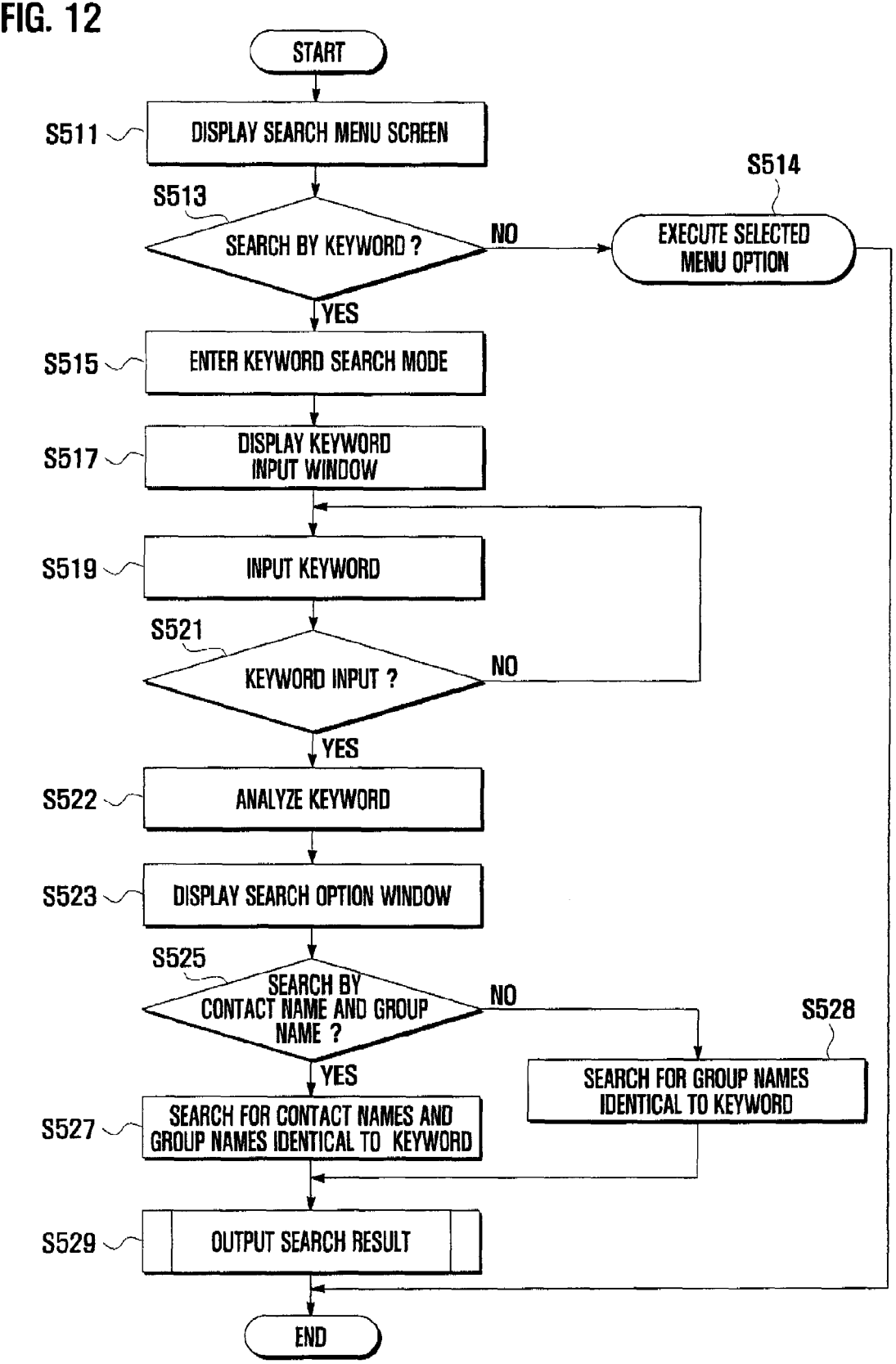
FIG. 12 and FIG. 13 are flow charts showing a process of searching data in a phone book group management method according to another exemplary embodiment of the present invention.
Figure 13:
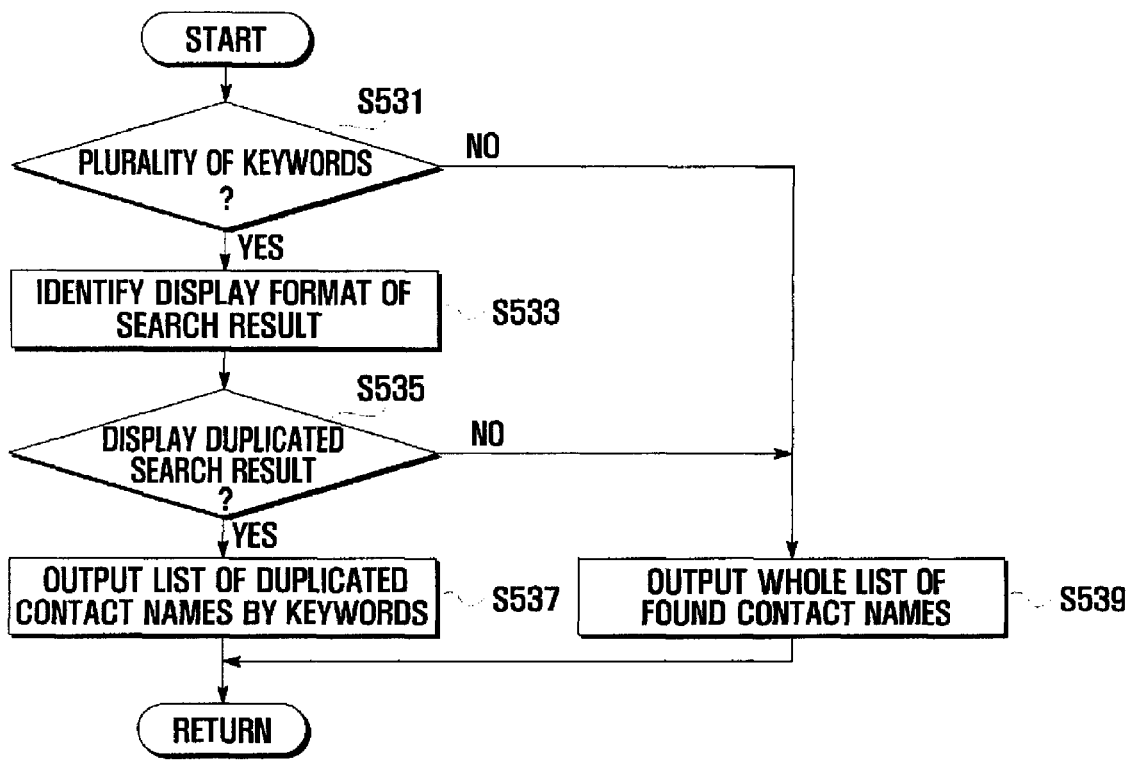

FIG. 12 and FIG. 13 are flow charts showing a process of searching data in a phone book group management method according to another exemplary embodiment of the present invention. FIG. 14A, FIG. 14B, FIG. 14C, FIG. 14D, and FIG. 14E show examples of a display screen in the process of searching data of FIG. 12 and FIG. 13.

Figure 14A:
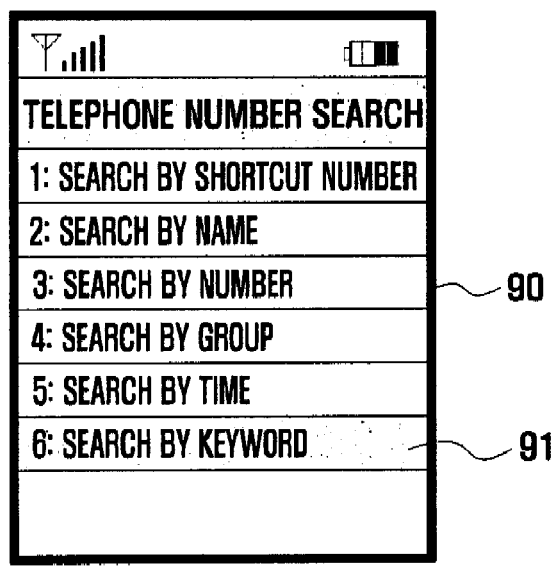
FIG. 14A, FIG. 14B, FIG. 14C, FIG. 14D, and FIG. 14E show examples of a display screen in the process of searching data of FIG. 12 and FIG. 13.

Referring to FIG. 12, the control unit 11 identifies a key input request for searching a contact name or a group name, and controls the display unit 23 to display a search menu screen for the phone book 27 (S511). The display unit 23 displays general menu options in the search menu screen 90, such as "search by shortcut number", "search by name", "search by number", "search by group", and "search by time", and additional menu option "search by keyword" 91, as shown in FIG. 14A.

Figure 14B:
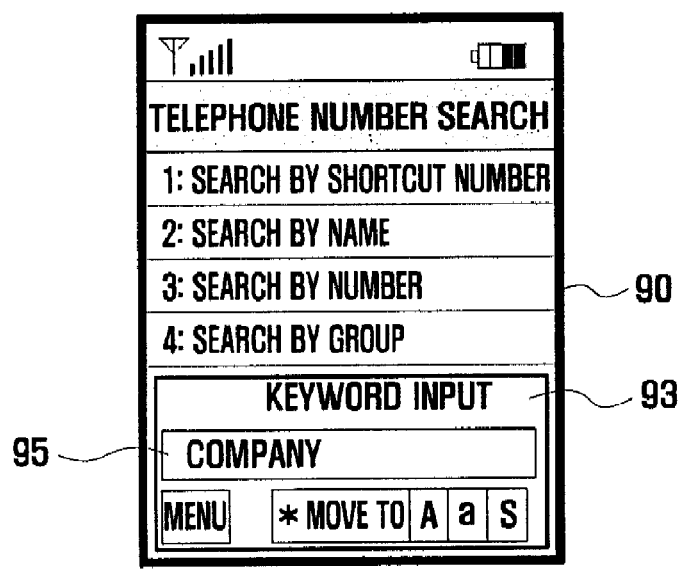

The control unit 11 determines whether the menu option "search by keyword" is selected by the user (S513). If the menu option "search by keyword" is selected, the control unit 11 controls the mobile terminal 10 to enter a "search by keyword" mode (S515). The control unit 11 then controls the display unit 23 to display a keyword input window 93 including a keyword input field 95 and awaits a keyword input, as shown in FIG. 14B (S517). If the menu option "search by keyword" is not selected, the control unit 11 executes the selected general menu option (S514), and terminates the procedure.

The control unit 11 identifies a keyword received from the key input unit 21 and inserts the keyword in the keyword input field 95 (S519). In this step, one or more keywords may be entered in the keyword input field 95. In the case of entering a plurality of keywords, the keywords are consecutively entered by inserting at least one identification symbol between the keywords adjacent to each other. Here, one of the identification symbols described already in the process of registering a group may be used.

After entering a keyword, the user may press a confirmation key to request searching. The control unit 11 identifies the input of a confirmation key (S521). If the confirmation key is entered, the control unit 11 analyzes the keyword (S522). In the case that a plurality of keywords is entered, each character string following an identification symbol is identified as a keyword. The step of analyzing a keyword may be executed at any time after the keyword is entered and prior to searching.

Figure 14C:
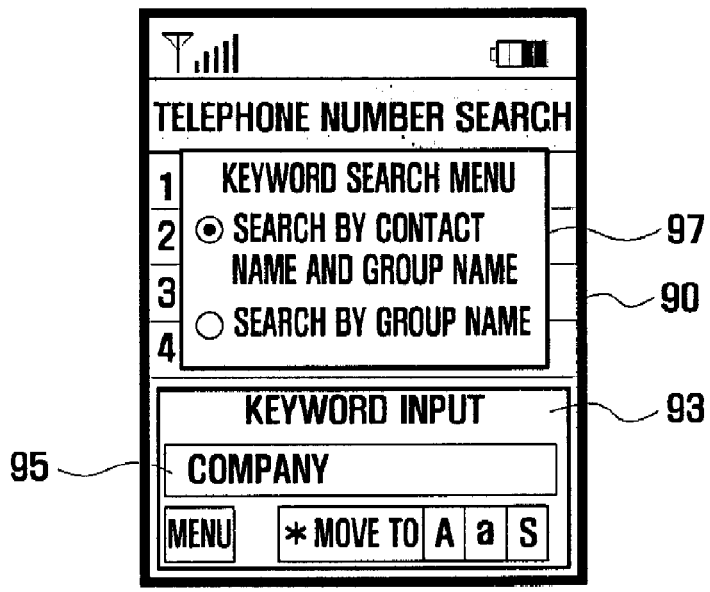

The control unit 11 displays a pop-up keyword selection menu window 97 to the display unit 23, as shown in FIG. 14C (S523). The control unit 11 provides keyword selection options such as "search by contact name and group name" and "search by group name" in the keyword selection menu window 97. In this step, the control unit 11 may search by a contact name and a group name as a default condition without displaying the keyword selection menu window 97.

The control unit 11 determines whether the "search by contact name and group name" option is selected by the user in the keyword selection menu window 97 (S525). If the "search by contact name and group name" option is selected, the control unit 11 searches for keyword contact names and group names having the analyzed keywords (S527). If a "search by group name" option is selected, the control unit searches only for group names (S528). In the case of using a plurality of keywords, the control unit 11 searches for each group name or for a group name and a contact name. After completing the search, the control unit 11 displays the search result in the display unit 23 (S529).

Referring to FIG. 13, in the step of displaying search results, the control unit 11 determines whether the search has been executed for a plurality of keywords (S531). If the search has been executed for a plurality of keywords, the control unit 11 identifies a predetermined display format for the search results (S533). If a display of a duplicated search result is selected (S535), the control unit displays a list of duplicated contact names for each keyword (S537). If the search has not been executed for a plurality of keywords at step S531, or if a display of a duplicated search result has not been selected at step S535, the control unit 11 displays a complete list of contact names found in the search (S539). When displaying the search result, all group names assigned to a contact name may be displayed. Alternatively, all contact names each with corresponding group names may be displayed simultaneously for easy identification of the group names assigned to the found contact name.

Figure 14D:
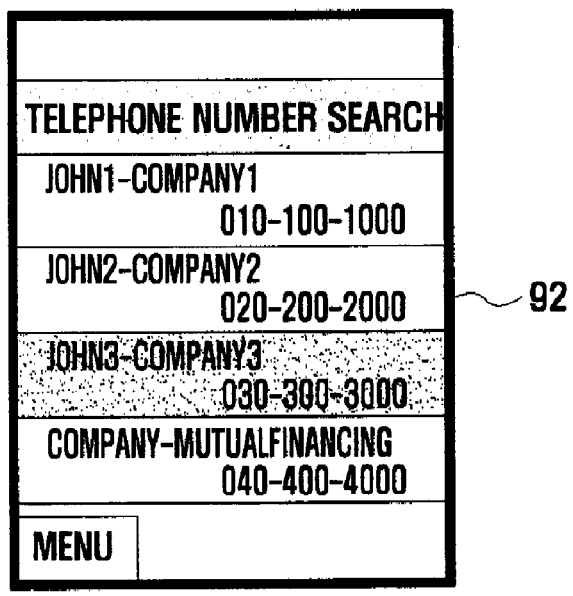

For example, in a case where the user selected menu option "search by keyword", entered "Company" as a keyword, and selected menu option "search by contact name and group name", the control unit 11 searches for contact names and group names and displays contact names and group names including the keyword "Company", such as, "John1-Company1", "John2-Company2", "John3-Company3", and "Company-MutualFinancing", in the display unit 23, as shown in the search result screen 92 of FIG. 14D. The search may be executed only for group names by selecting another menu option.

Figure 14E:
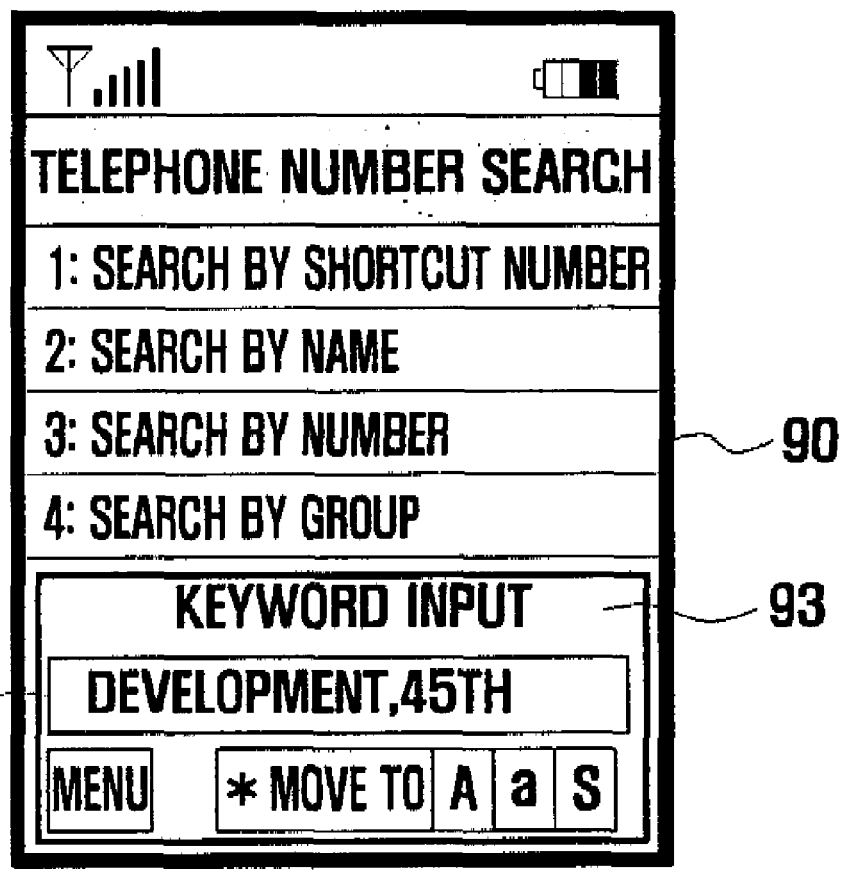

For example, in a case where a contact named "Alfred" is registered as a group member of "development department" and of "45th entry", the user may search for desired group members in both groups by selecting menu option "search by keyword" and by inputting "development,45th" in the keyword input field 95, as shown in FIG. 14E. The control unit 11 searches contact names registered in groups "development department" and "45th entry", and displays a search result of contact names registered in both groups in the display unit 23.

Figure 15:
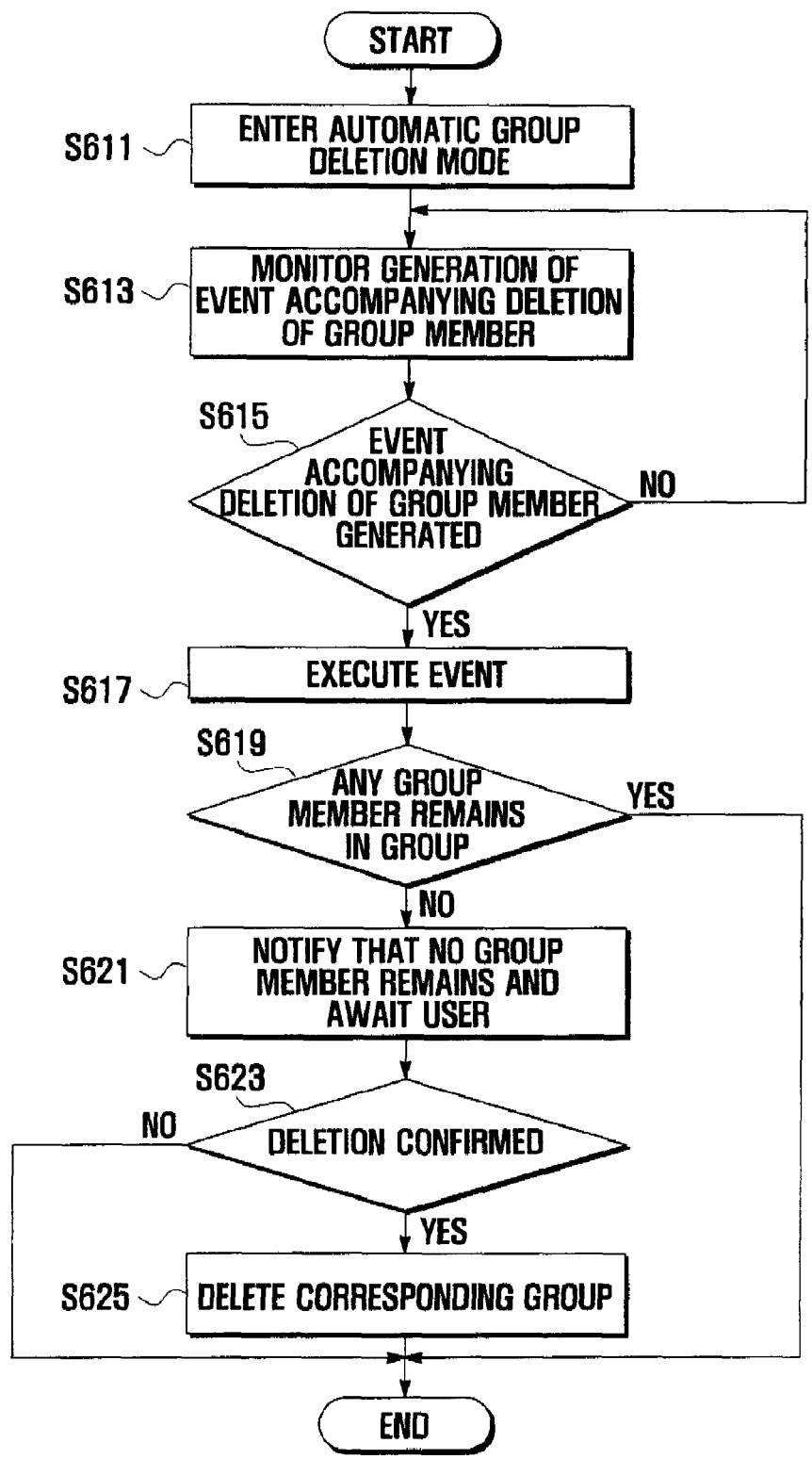
FIG. 15 is a flow chart showing a process of deleting data automatically in a phone book group management method according to another exemplary embodiment of the present invention.

FIG. 15 is a flow chart showing a process of deleting data automatically in a phone book group management method according to another exemplary embodiment of the present invention.

Referring to FIG. 15, if the user enables an automatic group deletion function in a setup procedure of mobile terminal functions, the control unit 11 controls the mobile terminal 10 to enter an automatic group deletion mode (S611), and monitors generation of an event accompanying deletion of a group member included in a group (S613). If an event for deleting a group member is generated (S615), the control unit 11 executes the event (S617). If a group member has become a member of another group before the generating the event, the group member may be automatically deleted from the group in which it was previously registered.

After performing the event, the control unit 11 determines whether any group member remains in the group (S619). If no group member remains in the group, the control unit 11 notifies the user that no group member remains in the group, and awaits user confirmation for deletion of the group (S621). If the final group member in the group has been deleted from the group, the control unit 11 displays a message (for example, "No group member remains. Delete group?") through a pop-up window and awaits user confirmation.

If deletion of the group is confirmed by the user (S623), the control unit 11 deletes the corresponding group (S625). By using the automatic group deletion function, empty groups may be conveniently and easily deleted from the phone book 27.

As described above, in the phone book group management method for a mobile terminal according to exemplary embodiments of the present invention, a new group of a phone book may be created in the process of registering a contact name in a phone book or in the process of editing a phone book without entering a group addition mode, thereby simplifying the process of registering a contact name in the mobile terminal.

Further, the user may use the phone book group management method effectively, because various functions for phone book group management are provided.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A phone book group management method for a mobile terminal, comprising:
   providing a display field for receiving a contact name and a group name of a phone book;
   receiving the contact name and the group name consecutively;
   analyzing the contact name and the group name; and
   creating a new group if the received group name does not exist in the phone book and simultaneously registering the input contact name in the new group as a group member,
   wherein receiving the contact name and the group name comprises sequentially receiving, in the display field, the contact name, a first identification symbol, a first group name, a second identification symbol, and a second group name.

2. The phone book group management method of claim 1, wherein receiving the first group name further comprises:
   searching a database for names having an identical character string to the first group name;
   displaying a list of the names having the identical character string to the first group name; and
   receiving a name in response to a group name being selected from the list of the names.

3. The phone book group management method of claim 2, further comprising receiving a new group name if no group name is selected from the list of the names.

4. The phone book group management method of claim 1, wherein, in the step of receiving the first group name, the first group name is distinguished from the contact name by the first identification symbol between the contact name and the first group name.

5. The phone book group management method of claim 1, wherein, in the step of receiving the first group name, the second identification symbol distinguishes the first group name from the ether second group name.

6. The phone book group management method of claim 1, wherein, in the step of analyzing the contact name and the group name, the contact name and the group name are analyzed according to the identification symbols between the contact name and at least one group name.

7. The phone book group management method of claim 1, wherein registering contact information in a group further comprises:
   setting a priority of executable functions by groups if a plurality of group names is analyzed.

* * * * *